Oct. 10, 1933.  G. T. SMITH-CLARKE  1,930,417
EXPANDING BRAKE
Filed Nov. 18, 1931
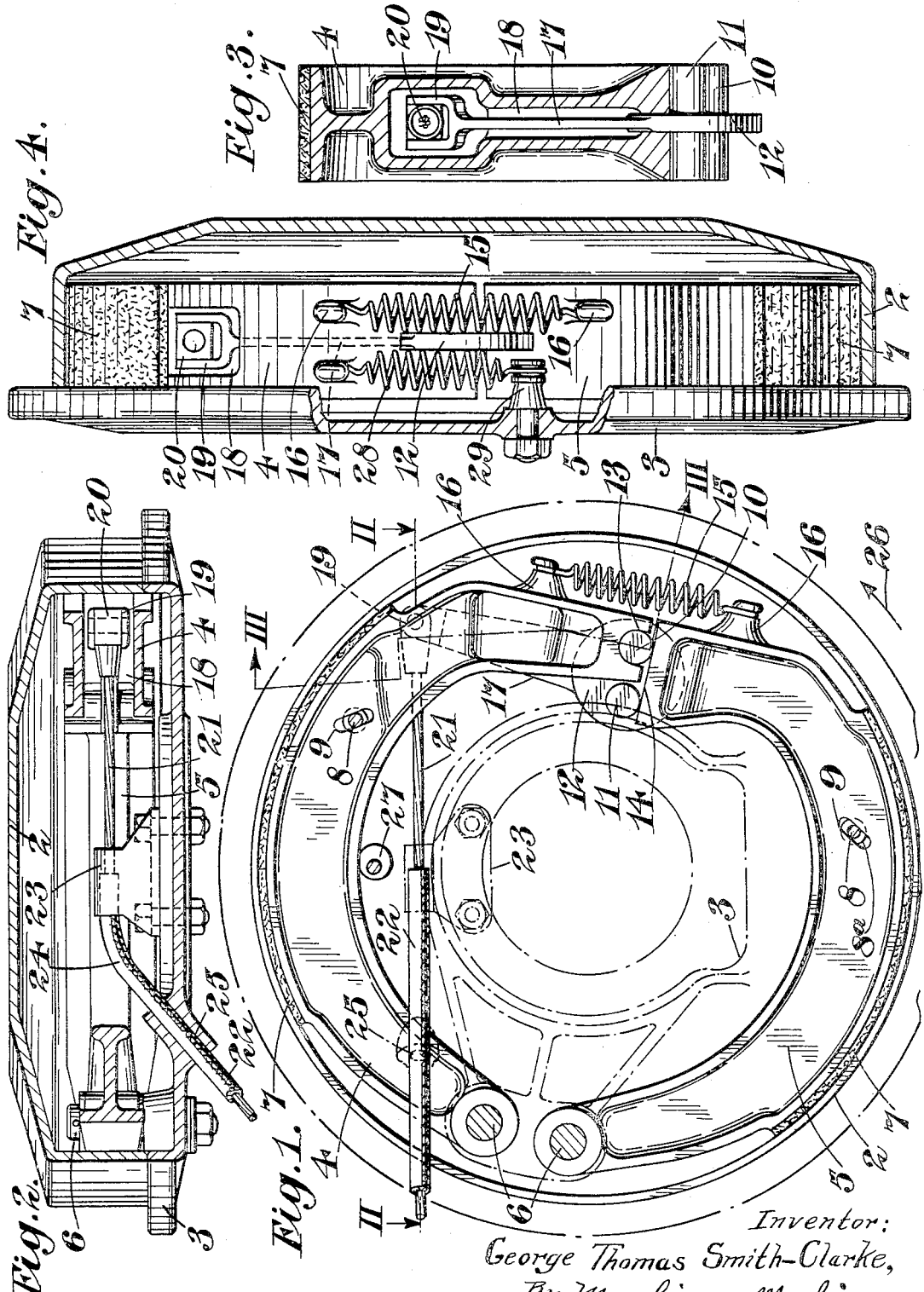
Inventor:
George Thomas Smith-Clarke,
By Mawhinney & Mawhinney,
Attys.

Patented Oct. 10, 1933

1,930,417

UNITED STATES PATENT OFFICE 1,930,417

EXPANDING BRAKE

George Thomas Smith-Clarke, Coventry, England, assignor to The Alvis Car & Engineering Company Limited, Coventry, England Application November 18, 1931, Serial No. 575,875, and in Great Britain December 6, 1930

9 Claims. (Cl. 188—78)

This invention relates to brakes which are non-servo (or not self-applying) of the kind having two shoes pivoted on a support and adapted to be expanded by means of a floating cam integral or fixedly attached to its actuating lever.

According to this invention, the actuating lever is accommodated in a recess in one of the shoes. Preferably the lever is arranged centrally of the width of the shoe and the operating rod or cable therefor is led angularly out of the plane of the brake.

In the accompanying drawing,

Figure 1 is a longitudinal vertical elevation of a brake drum and brake shoes adapted according to the invention, the anchor plate and some associated parts being removed but indicated by chain lines;

Figure 2 is a horizontal section thereof taken substantially on the line II—II of Figure 1;

Figure 3 is a vertical cross-section of one of the brake shoes and the lever-operated cam taken substantially on the line III—III of Figure 1; whilst Figure 4 is an end view taken from the right of Figure 1 with a part of the brake drum shown in section and a part of the anchor plate shown broken away.

In the arrangement illustrated, the means for securing the brake drum 2 upon the supporting hub (not shown) are omitted, as are also the means by which the anchor plate 3 is to be supported, these being well known in the art.

There are shown, however, two brake shoes 4, 5 supported upon pivot pins 6, 6 secured to the anchor plate, the brake shoes having a known form of lining 7, 7 to engage the internal periphery of the brake drum. The pins 8, 8 secured to the anchor plate operate in elongated slots 9, 9 in the shoes and spring washers 8a held on the pins against opposite sides of the shoes serve to locate them for movement about their pivotal axes.

In the present instance the cam is shown as comprising two studs 10, 11 extending transversely from a disc 12 which is co-planar with the longitudinal centre-lines of the brake shoes. One of these studs 10 lies within a substantially hemi-cylindrical recess 13 formed in the face of the shoe 4 and the other shoe has a straight face 14 which engages both the studs when the cam is in its fully "off" position, as indicated in Figure 1. A take-off spring 15 operates between the lugs 16, 16 formed on the shoes, and by this means the stud 10 is held in position between the co-operating faces of the brake shoes and the cam thus floatingly anchored.

The disc 12 is formed integrally with an actuating lever 17 disposed mainly within a recess 18 formed in the brake shoe 4. The free end of the lever is shaped as a stirrup 19 the crosspiece of which is secured to the end 20 of the flexible cable 21. The casing 22 for the latter is carried by an abutment 23 supported from the anchor plate, and it is bent as shown at 24 and passed through an inclined hole 25 in the anchor plate.

Thus, the floating cam and actuating lever therefor are located partly within one of the brake shoes and also within the plane of the brake shoes, and the whole apparatus is contained within the brake drum.

It is assumed that the direction of rotation of the drum in normal conditions is that indicated by the arrow 26, and a clearance stop 27, in the known form of an adjustable eccentric, is carried by the anchor plate. For preventing the brake shoes from vibrating about their pivots, a spring 28 is connected between the shoe 4 and a stud 29 secured to the anchor plate so as to hold the shoe 4 on the stop.

It will be seen that, when the cable is pulled relatively to the casing, so as to twist the cam, the brake shoes are separated; and as the cam and actuating lever are supported entirely by the shoes and do not operate about a fixed pivot, the shoes can adjust themselves so as to apply equal pressures.

Other advantages of the invention are that a very neat construction is obtained, as the anchor plate is devoid of the usual boss carrying the cam spindle, there is no external lever for twisting the cam and there is no bearing for the cam spindle which frequently causes trouble through lack of lubrication. The same design of brake can be used for either steering or non-steering wheels. If the former, the cable flexes outside the brake drum in accordance with the steering movements.

What I claim as my invention and desire to secure by Letters Patent of the United States is:—

1. An internal-expanding brake comprising a relatively rotatable drum and support, a pair of brake shoes pivotally anchored on said support with their free ends adjacent one another, one of said shoes having a recess near its free end, and a floating actuator supported between said free ends, said actuator having an arm extending into said recess longitudinally of said recessed shoe.

2. A shoe brake comprising a brake drum, pivotally-anchored shoes, and an actuator for thrusting said shoes with substantially equal pressures into contact with said drum, said actuator being supported solely by said shoes and comprising a pair of side-by-side studs and lever means holding said studs in spaced relation, one of said shoes having a recess partly to accommodate one of said studs between said shoes, said one shoe having a further recess partly to accommodate said lever means.

3. A shoe brake comprising a brake drum, pivotally-anchored shoes, and an actuator for thrusting said shoes with substantially equal pressures into contact with said drum, said actuator being supported solely by said shoes and comprising a pair of side-by-side studs and lever means holding said studs in spaced relation, one of said shoes having a recess partly to accommodate one of said studs between said shoes, said one shoe having a further recess partly to accommodate said lever means, said further recess being centrally of the width of the shoe.

4. A shoe brake comprising brake shoes pivotally-mounted at adjacent ends, one of said shoes having a central longitudinal recess at its free end, an actuator supported solely by said shoes between their free ends, said actuator having an arm extending into said recess longitudinally of said recessed shoe.

5. A shoe brake comprising brake shoes pivotally-mounted at adjacent ends, one of said shoes having a central longitudinal recess at its free end, an actuator supported solely by said shoes between their free ends, said actuator having an arm extending in said recess, and means for operating said arm extending transversely into said recess.

6. A shoe brake comprising brake shoes pivotally-mounted at adjacent ends, one of said shoes having a central longitudinal recess at its free end, an actuator supported solely by said shoes between their free ends, said actuator having an arm extending in said recess, and means for operating said arm extending transversely into said recess, said transversely-extending means being led out angularly from the central plane of the brake shoes.

7. A shoe brake comprising a brake drum, pivotally-anchored brake shoes, one of said shoes having a hollow therein, and a floating cam and lever for thrusting said shoes into contact with said drum, the free end of said lever being always disposed in said hollow and having operating means connected to it.

8. In a brake shoe construction, a brake drum, brake shoes movably mounted within the drum, one of said brake shoes having a longitudinal recess therein, and means for spreading said brake shoes including an arm movably mounted in the recess and extending longitudinally of the recess with its free end in the interior of the shoe.

9. In a brake shoe construction, a drum, brake shoes movably mounted in the drum and having ends disposed opposite one another, one end being substantially flat and wide in a radial sense, the end of the other shoe being narrow radially and having a cut away portion, and actuating means for the shoes having two radially separated studs both engaging the wide flat end in normal position, one of said studs lying within the cut away portion and engaging the end of the other brake shoe, the other stud lying beside and out of contact with the cut away end of the shoe.

GEORGE THOMAS SMITH-CLARKE.